(12) United States Patent
Byerly et al.

(10) Patent No.: US 7,338,380 B2
(45) Date of Patent: Mar. 4, 2008

(54) COMPOSITE SHAFT END ASSEMBLY AND COMPOSITE SHAFT FORMED THEREWITH

(75) Inventors: Duane V. Byerly, Lincoln, NE (US); Stewart A. Olson, Lincoln, NE (US); Joseph M. Gabriel, Raymond, NE (US)

(73) Assignee: Rexnord Industries, LLC, Milwaukee, WI (US)

( * ) Notice: Subject to any disclaimer, the term of this patent is extended or adjusted under 35 U.S.C. 154(b) by 133 days.

(21) Appl. No.: 11/081,166

(22) Filed: Mar. 16, 2005

(65) Prior Publication Data

US 2005/0209010 A1   Sep. 22, 2005

Related U.S. Application Data

(60) Provisional application No. 60/553,824, filed on Mar. 17, 2004.

(51) Int. Cl.
   *F16D 3/76* (2006.01)
(52) U.S. Cl. .................................. 464/89; 464/181
(58) Field of Classification Search .................. 464/89, 464/155, 181, 182; 403/225–228, 365, 367, 403/372
   See application file for complete search history.

(56) References Cited

U.S. PATENT DOCUMENTS

| | | | | |
|---|---|---|---|---|
| 1,839,094 | A | * | 12/1931 | Geyer ..................... 403/228 X |
| 2,004,712 | A | * | 6/1935 | Thiry .......................... 403/226 |
| 2,272,900 | A | * | 2/1942 | Saurer ..................... 403/228 X |
| 3,052,107 | A | | 9/1962 | Kempf |
| 3,096,106 | A | * | 7/1963 | Wanner .................... 464/89 X |
| 3,638,455 | A | | 2/1972 | Francois |
| 3,651,661 | A | | 3/1972 | Darrow |
| 3,850,722 | A | | 11/1974 | Kreft |
| 4,041,599 | A | | 8/1977 | Smith |
| 4,050,265 | A | * | 9/1977 | Drennen et al. ........ 403/372 X |
| 4,171,626 | A | | 10/1979 | Yates et al. |
| 4,236,386 | A | | 12/1980 | Yates et al. |
| 4,238,539 | A | | 12/1980 | Yates et al. |
| 4,248,062 | A | | 2/1981 | McClain et al. |
| 4,259,382 | A | | 3/1981 | Schwan |
| 4,265,951 | A | | 5/1981 | Yates et al. |
| 4,279,275 | A | | 7/1981 | Stanwood et al. |
| 4,325,174 | A | | 4/1982 | Smith et al. |
| 4,451,245 | A | | 5/1984 | Hornig et al. |
| 4,605,385 | A | | 8/1986 | Puck et al. |
| 4,722,717 | A | | 2/1988 | Salzman et al. |
| 5,062,914 | A | | 11/1991 | Fuchs et al. |
| 5,127,975 | A | | 7/1992 | Zackrisson et al. |
| 5,314,382 | A | | 5/1994 | Pfeifer |
| 5,379,964 | A | | 1/1995 | Pretto et al. |
| 5,383,811 | A | * | 1/1995 | Campbell et al. ............. 464/89 |
| 5,397,272 | A | | 3/1995 | Smiley et al. |
| 5,724,715 | A | | 3/1998 | Byerly et al. |
| 5,746,387 | A | | 5/1998 | Pretto et al. |

OTHER PUBLICATIONS

Wastewater & Pumping Driveshafts Driveline Service of Portland, Inc.; 2002.

* cited by examiner

*Primary Examiner*—Greg Binda
(74) *Attorney, Agent, or Firm*—Quarles & Brady LLP

(57) ABSTRACT

A composite shaft assembly includes a core having an outwardly facing surface. At least one structure embedded in a resilient material extends from the outwardly facing surface. The outwardly facing surface defines an outer surface spaced from the outwardly facing surface which is fixable to an inner surface of a composite shaft.

18 Claims, 3 Drawing Sheets

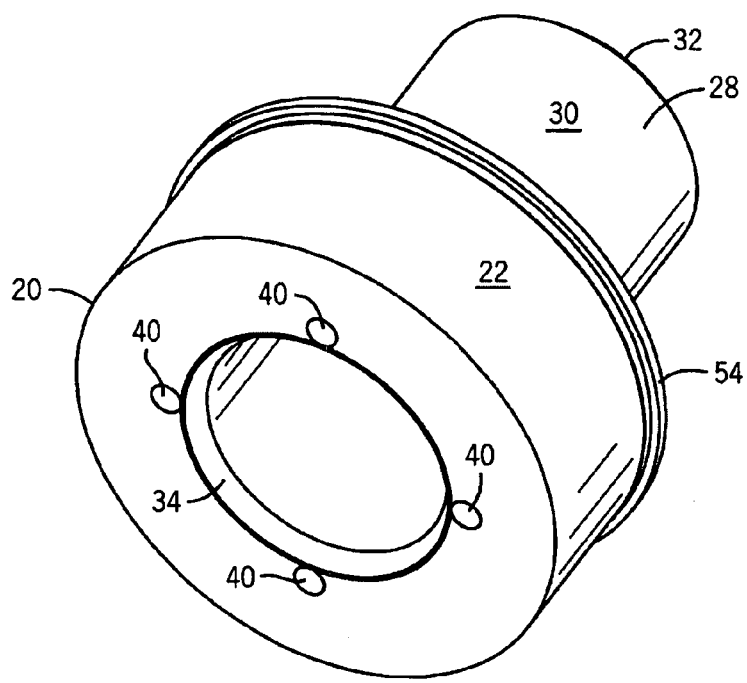
FIG. 3
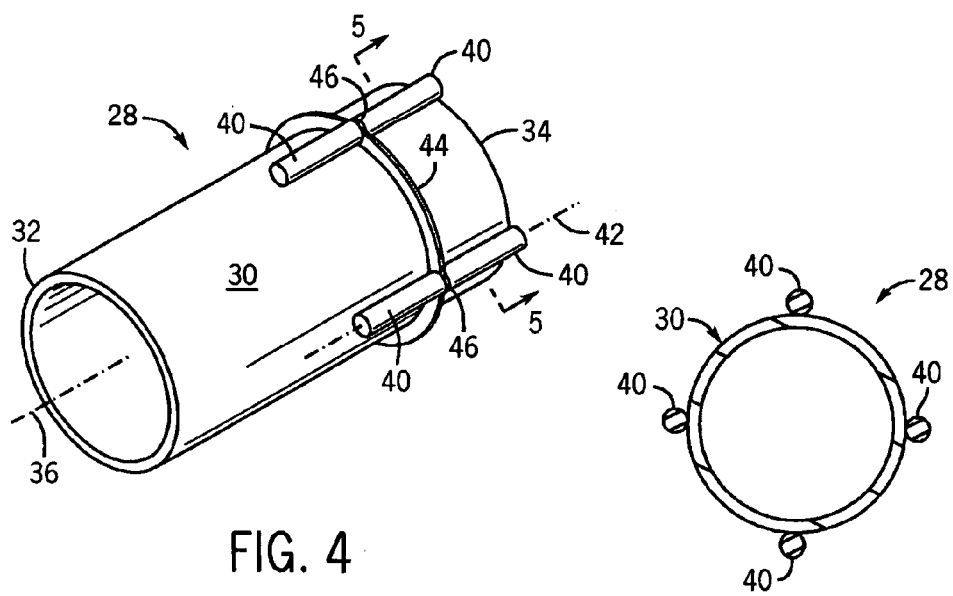
FIG. 4
FIG. 5

COMPOSITE SHAFT END ASSEMBLY AND COMPOSITE SHAFT FORMED THEREWITH

CROSS REFERENCES TO RELATED APPLICATIONS

This application claims the priority benefit of U.S. Provisional Patent Application No. 60/553,824 filed on Mar. 17, 2004.

STATEMENT REGARDING FEDERALLY SPONSORED RESEARCH

Not Applicable.

BACKGROUND OF THE INVENTION

This invention relates to composite shafts, and more particularly to a composite shaft end assembly, composite shafts formed therewith, and a method of forming composite shafts formed therewith.

Composite shafts are used to transmit rotational power between driver and driven rotating devices, and typically include a fibrous composite tube having opposing ends. An end assembly in each tube end connects to one of the rotating devices. Each end assembly has one end fixed to the composite tube and an opposing end adapted to connect to the rotating device. The end assemblies are formed from metal in order to withstand the forces exerted thereon by the rotating devices and for welding a fixture thereto.

Transmission of large torque loads across a joint between the fiber reinforced composite tube and the metal end assembly is not easy due to the different torsional stiffness in the materials and varying thermal coefficients. One known method includes using an epoxy adhesive to bond a metal fitting inserted into the composite tube to the composite tube, and then drilling holes through the composite material and fitting. Rivets inserted through the holes fix the end assembly to the metal fitting, and thus the composite tube. Another known method for joining a metal end assembly to a composite tube uses an interference fit compression joint, such as disclosed in U.S. Pat. No. 4,451,245, which clamps onto the end of the composite tube. Both of these methods are expensive to implement because of the tight tolerances of the metal parts that are required for the end assembly.

Other methods for transmitting torque loads across a metal-composite joint are also known that require special formation of the composite tube ends. For example, in one known method, the composite tube is formed around the end assemblies and then cured to bond the composite tube to the end assemblies. Keys and slots formed in the end assembly or tubes can be provided to rotatably fix the end assembly to the tube if the bond between the metal end assembly and composite tube fails. Unfortunately, once made, the length of these composite shafts cannot be changed to fit a particular application. As a result, an inventory of assembled composite shafts having standard lengths can be maintained. However, a custom shaft must be ordered and fabricated if a non-standard length is required.

SUMMARY OF THE INVENTION

The present invention provides a composite shaft that can be cut to a desired length just prior to final assembly. Moreover, the present invention provides a composite shaft end assembly that is easily installed in a composite tube end. The composite shaft assembly includes a core having an outwardly facing surface. At least one structure radially extends from the outwardly facing surface. A resilient material embedding the at least one structure defines an outer surface spaced from the outwardly facing surface of the core which is fixable to an inner surface of a composite shaft.

A general objective of the present invention is to provide a composite shaft assembly that is easy to assemble. This objective is accomplished by providing a composite shaft end assembly having a resilient material bondable to a composite tube to form the composite shaft assembly.

Another objective of the present invention is to provide a composite shaft end assembly that is inexpensive to manufacture. This objective is accomplished by making the end assembly with a core having radially extending structure and then forming a resilient material therein that is bondable to a composite tube.

Yet another objective of the present invention is to provide a composite shaft assembly and method of assembly that allows the composite shaft to be customized in the field for a particular application. This objective is accomplished by providing a composite shaft assembly having an end assembly including a resilient material that is fixable to an inner surface of the composite tube after the tube has been cut to a desired length.

The foregoing and other objects and advantages of the invention will appear from the following description. In the description, reference is made to the accompanying drawings which form a part hereof, and in which there is shown by way of illustration a preferred embodiment of the invention.

BRIEF DESCRIPTION OF THE DRAWINGS

FIG. 3 is a perspective view of the end assembly of FIG. 1;

FIG. 4 is a perspective view of the core of the end assembly of FIG. 1;

FIG. 5 is a cross sectional view of the core along line 5-5; and

Figure 1:
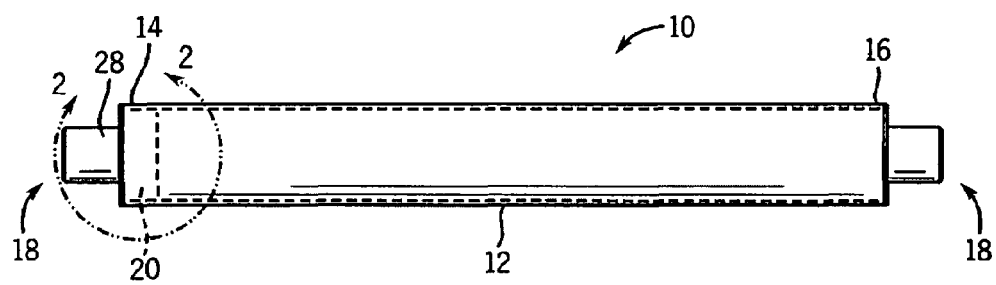
FIG. 1 is an elevational view of a composite shaft incorporating the present invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways and with other materials. Also, it is understood that the phraseology and terminology used herein is for the purpose of description and should not be regarded as limiting.

DESCRIPTION OF THE PREFERRED EMBODIMENT

Figure 2:
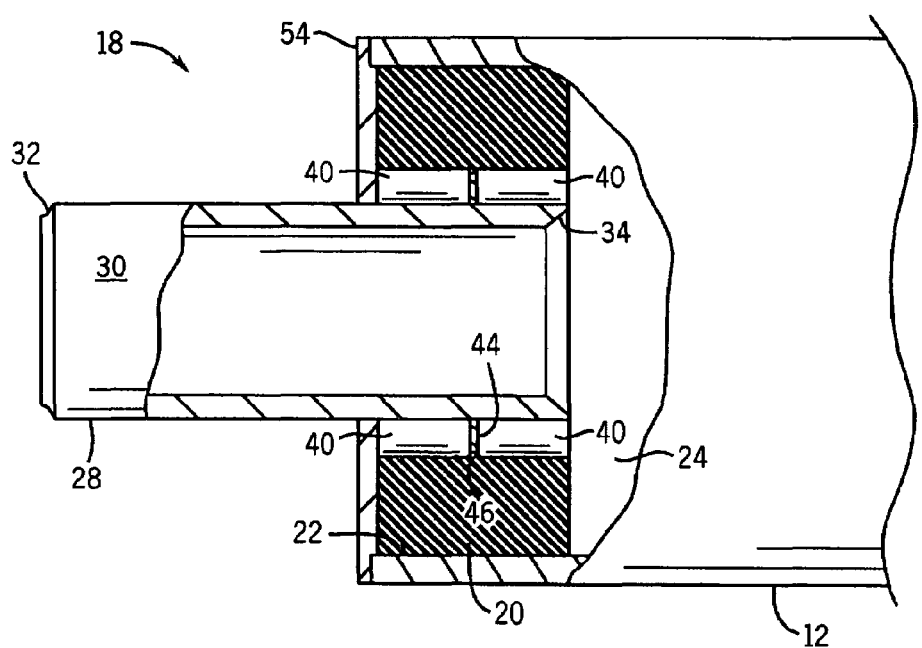
FIG. 2 is a cut away view along line 2-2 of FIG. 1.

A composite shaft assembly 10 shown in FIGS. 1 and 2 includes a tubular body 12 having open ends 14, 16. Each open end 14, 16 receives an end assembly 18 including a resilient material 20 defining an outer surface 22 bonded to an inner surface 24 of the tubular body 12. The composite shaft assembly 10 is especially suitable for connecting shafts spaced apart at least five feet, however, the composite shaft assembly 10 can be used for connecting shafts, or other rotating devices, spaced apart less than five feet without departing from the scope of the claims.

The tubular body 12 is known in the art, and is preferably a fibrous composite tube, such as formed from a continuous reinforcing fiber and polymer matrix in any one of a known manner, such as casting, filament winding, hand lay-up, and roll wrapping. The reinforcing fiber can be any suitable fiber, such as carbon, glass, wire, and the like, which is embedded in the polymer matrix. The polymer matrix can be any suitable material known in the art, such as a thermoset or thermoplastic resin which is cured to form the tubular body. Although a fibrous composite tube having a circular cross section is preferred, the tubular body 12 can have any cross section that defines an inner surface, such as a multi-sided geometric shape, oval, and the like, which is formed from any material bondable to the end assemblies 18, such as plastic, metal and the like.

Referring now to FIGS. 1-6, each end assembly 18 includes a core 28 with the resilient material 20 fixed thereto. The core 28 is preferably a cylindrical metal tube, or solid shaft, having a radially outwardly facing surface 30 extending between opposing ends 32, 34 and defining a longitudinal axis 36 extending through the ends 32, 34. The resilient material 20 is fixed to one end 34 of the core, and a fitting, universal joint, yoke, gear coupling, plate, or other shaft connecting structure can be fixed to the other core end 32 using methods known in the art, such as bolting, welding, pinning, and the like.

A metal core 28, such as formed from steel, is preferred, because of the strength characteristics of steel. The core 28, however, can be formed from any suitable material capable of withstanding the torque applied in the desired application. Moreover, although an outwardly facing surface 30 having a circular cross section is preferred to avoid stress points in the resilient material and cause premature failure of the end assembly 18, the outwardly facing surface 30 can define a non-circular cross section, such as a multi-sided geometric shape, without departing from the scope of the invention.

Circumferentially spaced rods 40 having a longitudinal axis 42 substantially parallel to the core longitudinal axis 36 are fixed to the core outer surface 30 proximal the one core end 34 and embedded in the resilient material 20. Preferably, the rods 40 are metal which is welded to the core 28 having a circular cross section to define a non-circular cross section (shown in FIG. 5) for locking on the resilient material 20 and transmitting torque from the core 28 to the resilient material 20 and vice versa. Of course the rods 40 can be used with a core 28 having a non-circular cross section without departing from the scope of the invention. Advantageously, the rods 40 have a circular cross section which does not have sharp edges that can form stress points in the resilient material 20 and cause premature failure of the end assembly 18. Although rods are preferred, other radially extending structure can be used depending upon the application without departing from the scope of the invention. For example, structure having multi-sided geometric shapes can be used if the torque transmission requirements are low. Moreover, other rounded shapes, such as elliptical rods and spheres fixed to the core outer surface can be used without departing from the scope of the invention.

In the embodiment disclosed herein, pairs of the rods 40 are axially aligned and spaced to define a gap 46 between each rod 40 in a pair for receiving a ring 44 therebetween. The radially extending ring 44 encircling the core 28 is axially fixed relative to the core outer surface 30 and embedded in the resilient material 20. The ring 44 axially fixes the resilient material 20 relative to the core 28, and transmits axial forces between the resilient material 20 and the core 28 and vice versa. The ring 44 can be welded to the core 28 and/or sandwiched between the rods 40. Although the ring 44 shown in FIG. 4 is sandwiched between the axially aligned rods 40 forming a pair of rods 40, the rods 40 on axially opposing sides of the ring 44 can be circumferentially offset without departing from the scope of the invention.

The resilient material 20 is preferably fixed to the core proximal one core end 34 embedding the rods 40 and ring 44. Although fixing the resilient material 20 proximal the one core end 34 is preferred, the resilient material 20, rods 40, and ring 44 can be centrally positioned on the core 28 without departing from the scope of the invention. The resilient material 20 is rotatably and axially locked onto the core 28 by the rods 40 and ring 44, and defines the radially outwardly facing surface 22 radially spaced from the radially outwardly facing surface 30 of the core 28.

In a preferred embodiment, the resilient material 20 has a torsional stiffness approximately equal to the torsional stiffness of the tubular body 12, and absorbs transitional torque loads as the composite shaft assembly 10 changes rotational speeds to avoid premature failure. Moreover, the resilient material 20 can be any material having a torsional stiffness compatible with the tubular body 12 and fixable, such as by bonding, shrink molding, mechanical fastening, and the like, to the tubular body 12, such as an elastomeric material including plastic, rubber and the like, without departing from the scope of the invention. The particular resilient material selected, however, is dependent upon the intended use of the end assembly.

Preferably, the resilient material 20 is formed from a curable material including continuous reinforcing fibers 50 and a polymer matrix in any one of a known manner, such as casting, filament winding, hand lay-up, and roll wrapping. The polymer matrix can be any suitable material known in the art, such as a thermoset or thermoplastic resin which is cured to form the resilient material. Although continuous fiber 50 impregnated with the polymer matrix is preferred because a non-continuous fiber material or plastic is prone to splitting, cracking, ratcheting, or degradation when a large torque is applied, the resilient material 20 can be a polymer matrix alone or including filler, such as non-continuous fiber material, metal beads, flakes, and the like, for use in certain applications, such as low torque applications, without departing from the scope of the invention.

Figure 6:
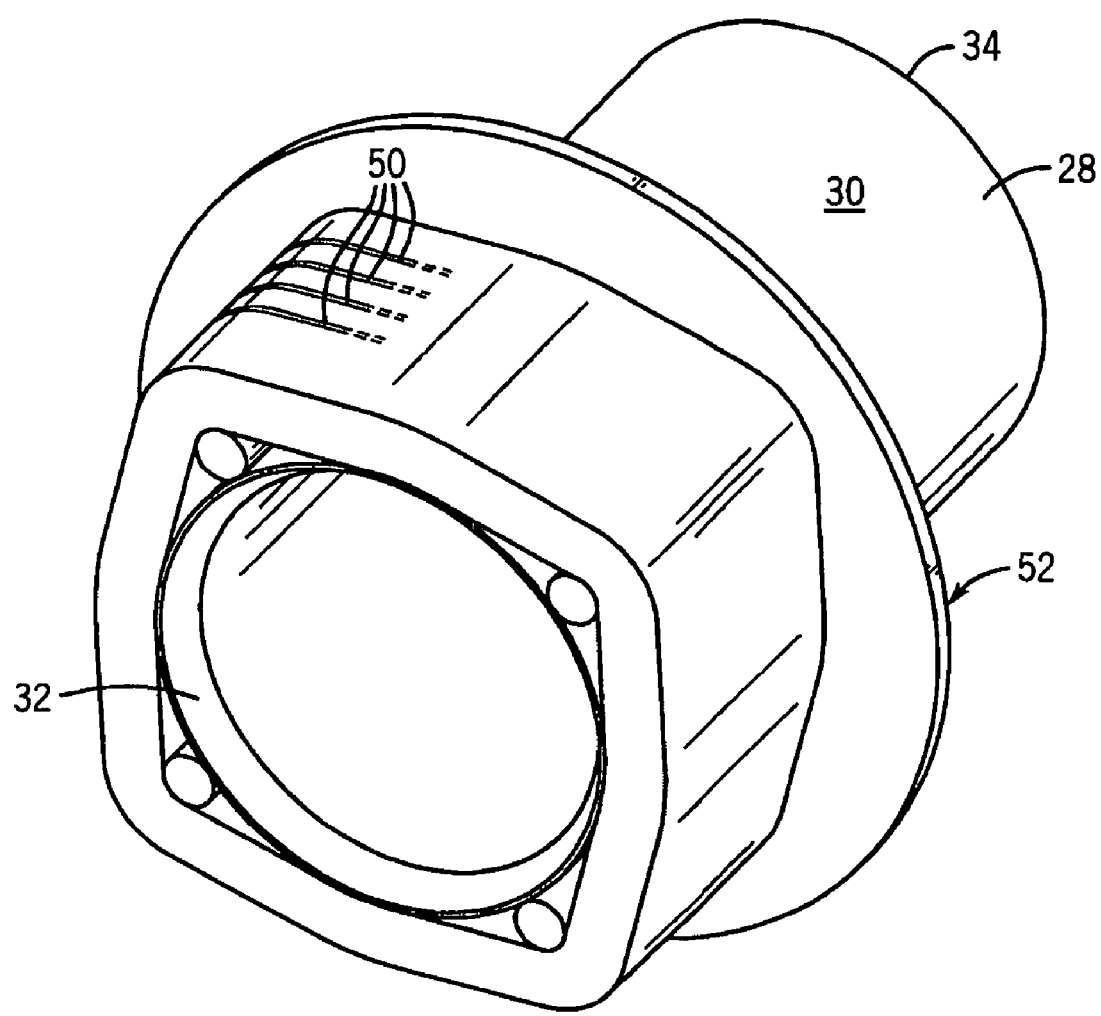
FIG. 6 is a perspective view of the end assembly having continuous fiber wound thereon.

The reinforcing fibers 50 can be any suitable fiber, such as carbon, glass, wire, and the like, which is embedded in the polymer matrix. Although four continuous reinforcing fibers 50 are shown in FIG. 6, any number of continuous fibers can be used without departing from the scope of the invention.

Advantageously, once the curable material has been cured to form the resilient material 20, the radially outwardly facing surface 22 of the resilient material 20 can be shaped, such as by grinding, machining, and the like, to conform with the inner surface 24 of the tubular body 12. In the embodiment disclosed herein, the outwardly facing surface 22 is stepped to form a tube stop 54 that abuts the tubular body end 14 and prevents the end assembly 18 from being inserted too far into the tubular body 12. Preferably, the radially outwardly facing surface 22 of the resilient material 20 has a circular cross section that conforms with the inner surface 24 of the tubular body 12 to minimize manufacturing costs of the end assembly 18.

The radially outwardly facing surface 22 of the resilient material 20 is preferably bonded to the inner surface 24 of the tubular body 12 by an adhesive. Preferably, the adhesive is an aerospace epoxy adhesive that forms a strong adhesive bond between the resilient material 20 and tubular body 12 capable of resisting torque loads applied to the composite shaft assembly 10. However, any suitable adhesive can be used. Although bonding the resilient material 20 to the inner surface 24 of the tubular body 12 using an adhesive is preferred, if the resulting composite shaft assembly 10 is a standard length, or made to order, the resilient material 20 can be bonded to the inner surface 24 of the tubular body 12 by forming the resilient material 20 after it has been inserted into the tubular body end 14 to bond the resilient material 20 to the tubular body inner surface 24 without an adhesive or forming the tubular body 12 around the completed end assemblies 18.

In one embodiment, the composite shaft assembly 10 is made by providing the tubular body 12 having the open ends 14, 16 and defining the inner surface 24. Since the tubular body ends 14, 16 do not require any particular reinforcing or shape, the tubular body 12 can be purchased, or made, in standard lengths and then cut to the desired length for a particular application. Moreover, due to the simple assembly of the composite shaft assembly 10, it can be supplied in a kit comprising the tubular body 12 and end assemblies 18, wherein the tubular body 12 is cut to the desired length just prior to final assembly of the assembled composite shaft assembly 10.

In the embodiment disclosed herein, each end assembly 18 is formed by providing the metal core 28, and welding a first set of circumferentially spaced rods 40 to the core radially outwardly facing surface 30 axially spaced from the one end 34 of the core 28. The ring 44 is slipped over the core end 34 and positioned in abutment with the first set of circumferentially spaced rods 40. A second set of circumferentially spaced rods 40 are then welded to the core 28 between the ring 44 and core end 34 to sandwich the ring 44 between the first and second set of circumferentially spaced rods 40.

Mold dams 52 (only one shown) are then slipped onto the core 28 from the opposing core ends 32, 34. The mold dams 52 preferably abut axially opposing ends of the rods 40 to define axial faces of the resilient material 20. The reinforcing fiber 50 is then wound, or cast, over the rods 40 and ring 44 between the mold dams 52 with the polymer matrix. The polymer matrix is then cured to form the resilient material 20, which, advantageously, shrinks to lock onto the core 28. Although curable material, such as the reinforcing fiber 50 impregnated in the polymer matrix which shrinks to lock onto the core 28, is preferred, other curable material that can be cured to form the resilient material 20, such as disclosed above, can be used without departing from the scope of the invention. Once the resilient material 20 has been cured, the mold dams 52 can be removed.

The resilient material 20 can then be shaped, such as by machining, grinding, and the like, to form the radially outwardly facing surface 22 of the resilient material 20 such that it conforms with the inner surface 24 of the tubular body 12. Of course, the resilient material 20 can be shaped to have keys and other structure, as desired, however, a resilient material 20 having a circular cross section is preferred. Preferably, the resilient material is shaped to include a step forming a tube stop 54 that abuts the tubular body end 14 and prevents the end assembly 18 from being inserted too far into the tubular body 12.

The adhesive is then applied to at least one of the inner surface 24 of the tubular body 12 and the radially outwardly facing surface 22 of the resilient material 20, and the resilient material 20 is slipped into the end 14 of the tubular body 12. Upon curing of the adhesive, the resilient material 20 is bonded to the inner surface 24 of the tubular body 12 to fix the end assembly 18 in the tubular body end 14. The second end assembly 18 is fixed in the other end 16 of the tubular body 12 using the same procedure described above if a second end assembly 18 is desired. In an alternative embodiment, the end assembly 18 is slipped into the end 14 of the tubular body 12 prior to curing the curable material, and the curable material is then cured to form the resilient material 20 and bond the resilient material 20 to the inner surface 24 of the tubular body 12 to fix the end assembly 18 in the tubular body end 14.

While there has been shown and described what are at present considered the preferred embodiment of the invention, it will be obvious to those skilled in the art that various changes and modifications can be made therein without departing from the scope of the invention defined by the appended claims. Therefore, various alternatives and embodiments are contemplated as being within the scope of the following claims particularly pointing out and distinctly claiming the subject matter regarded as the invention. For example, the core can include radially inwardly extending structure, such as axial slots, circumferential grooves, and the like, to fix the resilient material relative to the core.

We claim:

1. A composite shaft end assembly comprising:
   a core having an outwardly facing surface and defining a longitudinal axis;
   at least one structure radially extending from said outwardly facing surface and transmitting torque to said core about said axis; and
   a resilient material molded onto said at least one structure and defining an outer surface spaced from said outwardly facing surface which is fixable to an inner surface of a composite shaft and absorbs transitional torque loads as said core changes rotational speeds.

2. The assembly as in claim 1, in which a tube stop formed in the resilient material is engageable with an end of the composite shaft.

3. The assembly as in claim 1, in which said core has a circular cross section.

4. The assembly as in claim 1, in which said structure embedded in said resilient material extends radially outwardly from said outwardly facing surface.

5. The assembly as in claim 4, in which said core defines a longitudinal axis, and said structure is at least a portion of one rod having a circular cross section fixed to said core and substantially aligned with said longitudinal axis.

6. The assembly as in claim 4, in which said core defines a longitudinal axis, and said structure is at least one ring fixed to said core and substantially coaxial with said longitudinal axis.

7. The assembly as in claim 1, in which said core includes first and second ends, and one of said first and second ends is adapted for connecting to an adjacent shaft.

8. The assembly as in claim 1, in which said resilient material includes a continuous fiber embedded in a polymer matrix.

9. A composite shaft assembly comprising:
   a tubular shaft formed from a resilient material and having opposing open ends defining an inner surface; and
   at least one shaft end assembly received in one end of said opposing ends, said end assembly including a core having an outwardly facing surface, at least one structure radially extending from said outwardly facing surface, and a resilient material embedding said at least one structure and defining an outer surface spaced from said outwardly facing surface and bonded to said inner surface of said tubular shaft, wherein said at least one structure transmits torque between said core and said resilient material and said resilient material transmits torque between said tubular shaft and said at least one structure, and said resilient material absorbs transitional torque loads as the composite shaft assembly changes rotational speeds.

10. The assembly as in claim 9, in which a tube stop formed in said resilient material engages said one end of said tubular shaft.

11. The assembly as in claim 10, in which said structure embedded in said resilient material extends radially outwardly from said outwardly facing surface.

12. The assembly as in claim 11, in which said core defines a longitudinal axis, and said structure is at least a portion of one rod having a circular cross section fixed to said core and substantially aligned with said longitudinal axis.

13. The assembly as in claim 11, in which said core defines a longitudinal axis, and said structure is at least one ring fixed to said core and substantially coaxial with said longitudinal axis.

14. The assembly as in claim 10, in which said core is cylindrical.

15. The assembly as in claim 9, in which said core includes first and second ends, and one of said first and second ends is adapted for connecting to an adjacent shaft.

16. The assembly as in claim 9, in which said resilient material includes a continuous fiber embedded in a polymer matrix.

17. The assembly as in claim 9, in which said resilient material is molded onto said at least one structure to embed said at least one structure in said resilient material.

18. The assembly as in claim 9, in which said resilient material has a torsional stiffness approximately equal to a torsional stiffness of said shaft.

* * * * *